July 10, 1951 H. JENSEN 2,559,964
BEARING SEAL
Filed Oct. 17, 1945 2 Sheets-Sheet 1

INVENTOR
HANS JENSEN
BY Harry H. Hitzeman
ATTORNEY.

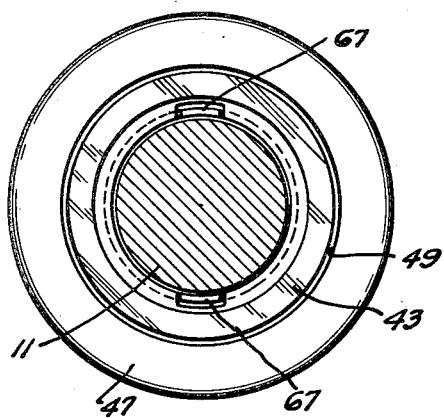
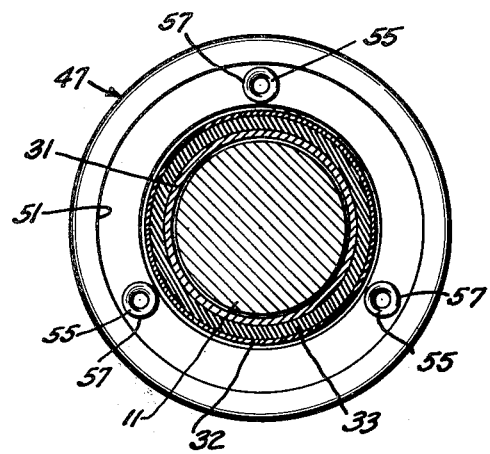
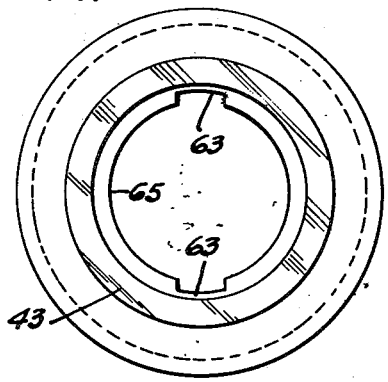
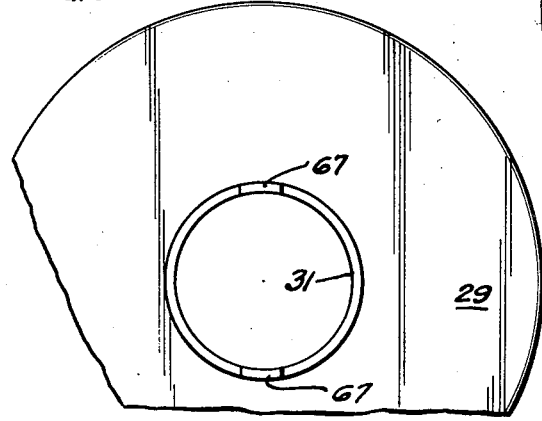
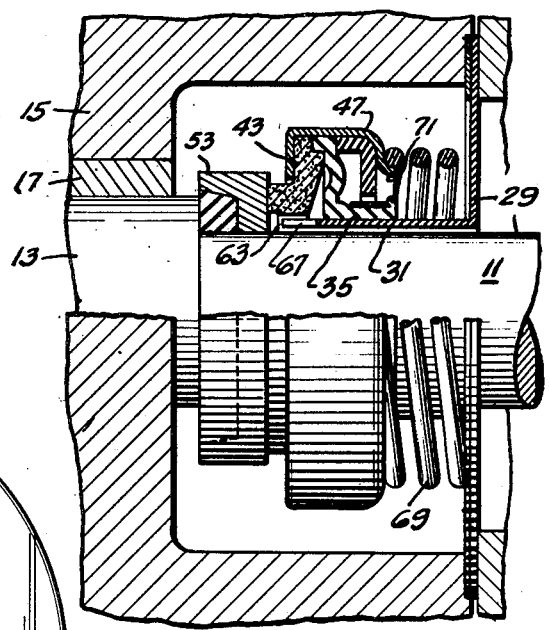

Patented July 10, 1951

2,559,964

UNITED STATES PATENT OFFICE 2,559,964

BEARING SEAL

Hans Jensen, Arlington Heights, Ill., assignor, by mesne assignments, to Rotary Seal Company, Chicago, Ill., a corporation of Illinois Application October 17, 1945, Serial No. 622,721

1 Claim. (Cl. 286—11)

My invention relates to bearing seals and similar devices.

My invention relates more particularly to sealing devices or sealing means adapted to form a fluid seal between two relatively rotated parts.

The principal object of the present invention is to provide a new and improved bearing seal for preventing the leakage of fluid past bearing surfaces or relatively rotary parts.

A further object of the present invention is to provide such a seal that is very efficient in operation and capable of being constructed with a minimum of parts.

Heretofore great difficulty has been encountered in preventing liquid or fluid contained in a housing that supports a rotating shaft from escaping from the housing along the shaft. This difficulty is encountered particularly in automotive constructions such as automotive water pumps in which the housing contains lubricant for minimizing friction between the moving parts and the bearings therefor. The same difficulty arises in pump and fluid motor constructions of various types, in compressors for refrigerators, in pumps and other mechanisms for use in handling milk or other materials, and in a great many other industries than those mentioned. While various constructions have been proposed to obviate the difficulty just referred to, such constructions have not generally been entirely satisfactory. One type of sealing device at present on the market contemplates the provision of bellows to hold the sealing device against the bearing surface. These devices have been unsatisfactory for the reason that because of the action of the shaft in the housing and its variation from a single plane, the sealing member is moved about with the shaft, causing the bellows to crack after a very short life. Another objection to various types of sealing devices at present on the market lies in the fact that they are comparatively large and composed of a great number of parts. This naturally diminishes their desirability for use in locations where the space is small and also in places where repair or replacement requires the dismantling of a considerable part of a machine.

Other objects of the present invention are to provide a bearing seal that is so constructed that regardless of the hard and rough usage which it receives, it will not easily wear out or become broken.

In the preferred embodiment of my invention, the principal object is to provide an improved bearing seal of a type wherein the flexible member which thrusts the bearing nose against a bearing surface under resilient pressure is carried by a flange sleeve that is fixedly secured to the mechanism surrounding the shaft, so that the only strain upon the flexible member is that which is imparted by the longitudinal movement of the shaft.

A further object of the invention is to provide in a bearing seal of the type described a combination wherein the flange sleeve has a positive drive for rotary movement of the bearing nose directly connected thereto so that the only strain that is placed upon the diaphragm results from the longitudinal movement of the shaft.

A further object of the present invention is to provide a bearing seal of the type described that can be readily secured or positioned or removed from an installation without disturbing the shaft, the bearing in which the shaft rotates or other associated parts.

Other objects and advantages will be more apparent from the following description wherein reference is had to the accompanying two sheets of drawings upon which:

Fig. 2 is a vertical cross sectional view of the bearing nose and associated parts taken on the lines 2—2 of Fig. 1.

Fig. 3 is a cross sectional view through the bearing seal assembly and shaft taken generally on the lines 3—3 of Fig. 1.

Fig. 4 is a front elevational view of the bearing nose.

Fig. 5 is a fragmentary front elevational view of the bearing sleeve; and

Fig. 6 is a cross sectional view of a modified form of construction.

Figure 1:
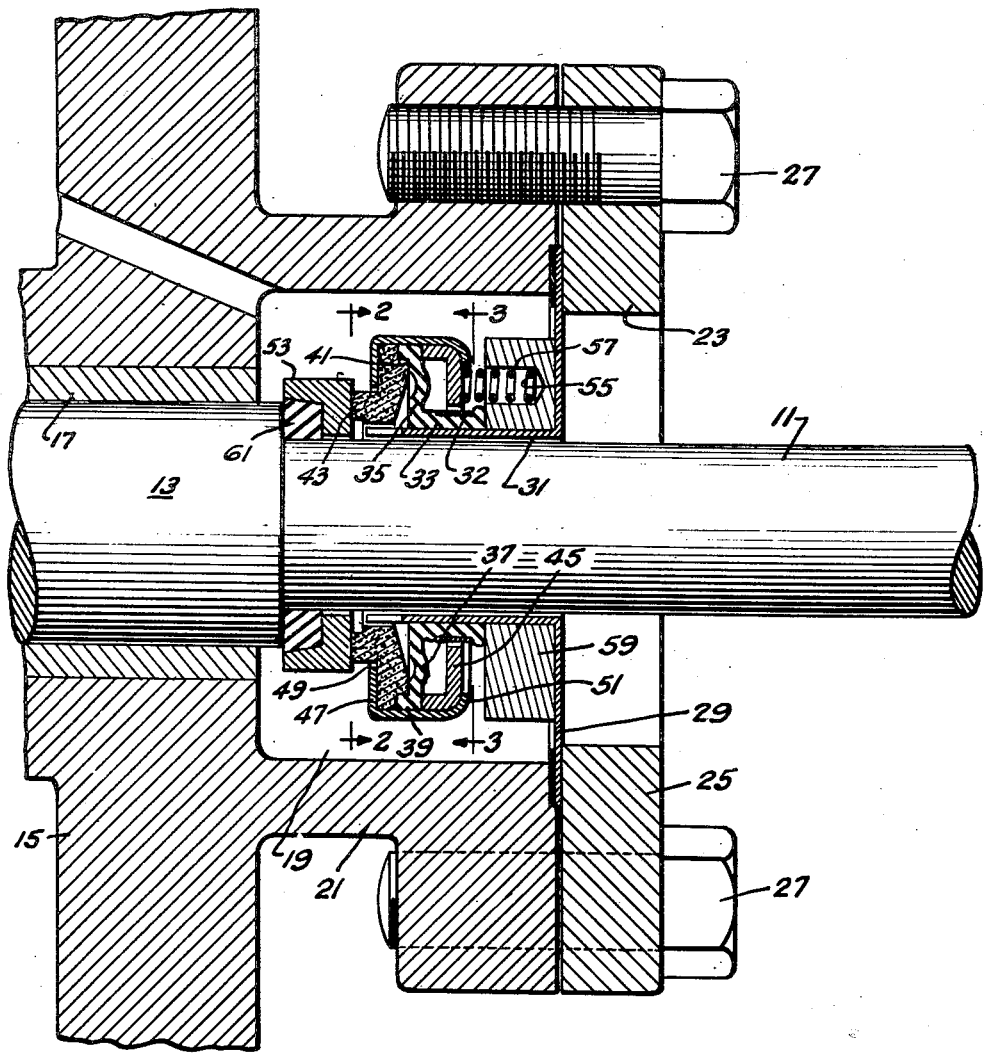
Fig. 1 is a vertical sectional view through a compressor or other pump mechanism housing showing a rotating shaft extending from the housing with my improved bearing seal mounted in operative position thereon.

In the embodiment of the invention which I have chosen to illustrate and describe, I have shown a rotatable shaft 11 which has an enlarged portion 13 that extends through the vertical wall 15 of a housing within which fluid under pressure may be present, the shaft being mounted in a suitable bearing 17 in the housing wall. The shaft may extend through an enlarged opening 19 in the portion 21 of the wall 15 and through an opening 23 in a cover plate 25 that is positioned over the opening being secured thereto by suitable bolt members 27.

The flange sleeve 29 may have a tubular portion 31 telescopically mounted over the shaft 11 and adapted to cooperate with a band 32 that rigidly fastens the portion 33 of the diaphragm 35 therebetween. The diaphragm 35 may be formed with the lateral flange 37 having a groove therein to provide additional movement thereto and a shoulder 39 which is positioned against an annular ledge 41 of the bearing nose 43. A backing plate 45 completes the assembly and the backing plate diaphragm and bearing nose are assembled together in a metal shell 47 which has an opening 49 through which the bearing nose protrudes and a curled over portion 51 to enclose the backing plate 45.

Means for holding this assembly as a unit against a shoulder seal 53 comprises a plurality of coiled spring members 55 which are seated in suitable pockets 57 in a collar 59 that surrounds the tubular portion 31 of the flange sleeve 29. The shoulder seal 53 may be constructed of any suitable bearing material and include a flexible collar 61 by means of which the same is held on the shaft 11 and rotates therewith.

Means other than the diaphragm 35 are provided for holding the bearing nose 43 against rotation. This means may include a pair of slots 63 in the bore 65 through the bearing nose and a pair of arms 67 which extend forward from the flange portion 31 and engage in the slots.

With this construction, it can be seen that the bearing seal assembly holds the bearing nose against rotation so that a seal may be obtained on the lapped faces of the bearing nose 43 and the sealing ring 53. Longitudinal movement of the shaft 11 and associated parts is permitted by means of the coiled spring members 55 yieldingly holding the bearing surfaces together even though there may be longitudinal movement as the shaft is rotating.

In Fig. 6, I have shown a modification of construction wherein no collar is employed and a coiled spring 69 is employed in place of the plurality of small compression springs 55. This construction may be employed where less space is available to position a bearing seal and requires only the curling out of the shell 47 at 71 to form a seat for the end of the coiled spring 69.

While I have illustrated and described a specific embodiment of the invention, it will be apparent to those skilled in the art that changes and modifications may be made in the exact details shown and I do not wish to limit myself in any way; rather what I desire to secure and protect by Letters Patent of the United States is:

A shaft seal for a rotating shaft member and a cooperating sleeve member in which it extends, wherein one of said members carries means forming a seal seat, said shaft seal comprising a seal ring having a central opening formed to encircle the shaft and to make running contact with said seal seat, a flexible diaphragm of resilient rubber-like material comprising a central sleeve-like portion providing an opening through which the shaft may extend, and a peripheral portion extending at the outer edge of the seal ring, retaining means clampingly securing the peripheral portions of said seal ring and diaphragm, mounting means secured on the other of said members and formed to encircle the shaft member and to clampingly engage the central sleeve-like portions of said diaphragm to secure the same upon said other member, means forming a spline finger on and projecting from said other member and extending in position within the central opening of the seal ring for splined engagement therewith for preventing relative rotation of said seal ring while allowing axial motion thereof with respect to said other member, and spring means supported on said other member in position bearing on said mounting means to urge the seal ring in a direction to engage with the seal seat.

HANS JENSEN.

REFERENCES CITED

The following references are of record in the file of this patent:

UNITED STATES PATENTS

| Number | Name | Date |
|---|---|---|
| 1,170,450 | Lachmann | Feb. 1, 1916 |
| 1,795,546 | Evans | Mar. 10, 1931 |
| 1,898,278 | Weis | Feb. 21, 1933 |
| 2,100,220 | King | Nov. 23, 1937 |
| 2,200,413 | Christman et al. | May 14, 1940 |
| 2,220,771 | McHugh | Nov. 5, 1940 |
| 2,347,118 | Matter | Apr. 18, 1944 |
| 2,373,463 | Curtis | Apr. 10, 1945 |
| 2,432,694 | Snyder | Dec. 16, 1947 |